Jan. 31, 1956  V. W. BALZER  2,732,975
SEED PLANTER

Filed June 18, 1951   4 Sheets-Sheet 1

VERNON W. BALZER,
INVENTOR.

HUEBNER, BEEHLER,
WORREL & HERZIG,
ATTORNEYS.
BY
Warren T. Jessup

Jan. 31, 1956   V. W. BALZER   2,732,975
SEED PLANTER
Filed June 18, 1951   4 Sheets-Sheet 2
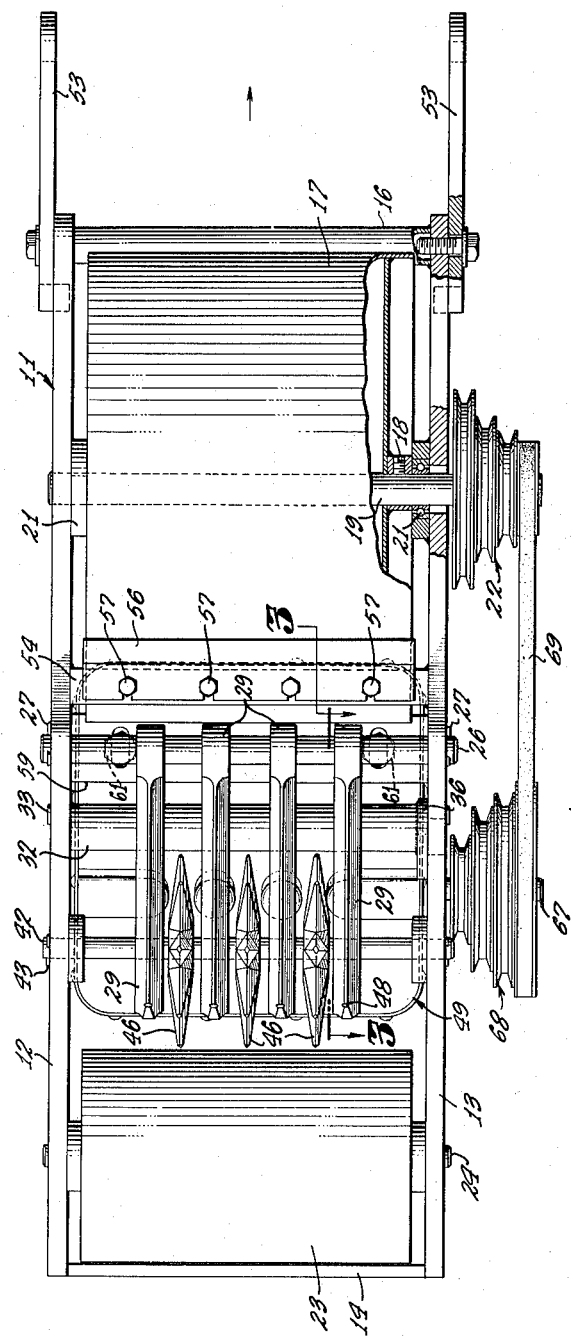
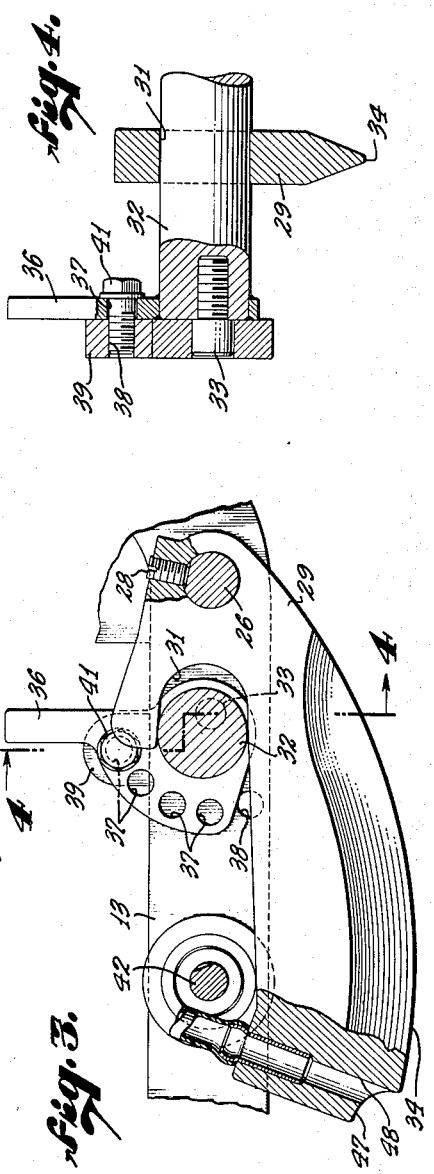
VERNON W. BALZER,
INVENTOR.
HUEBNER, BEEHLER,
WORREL & HERZIG,
ATTORNEYS.
BY Warren T. Jessup

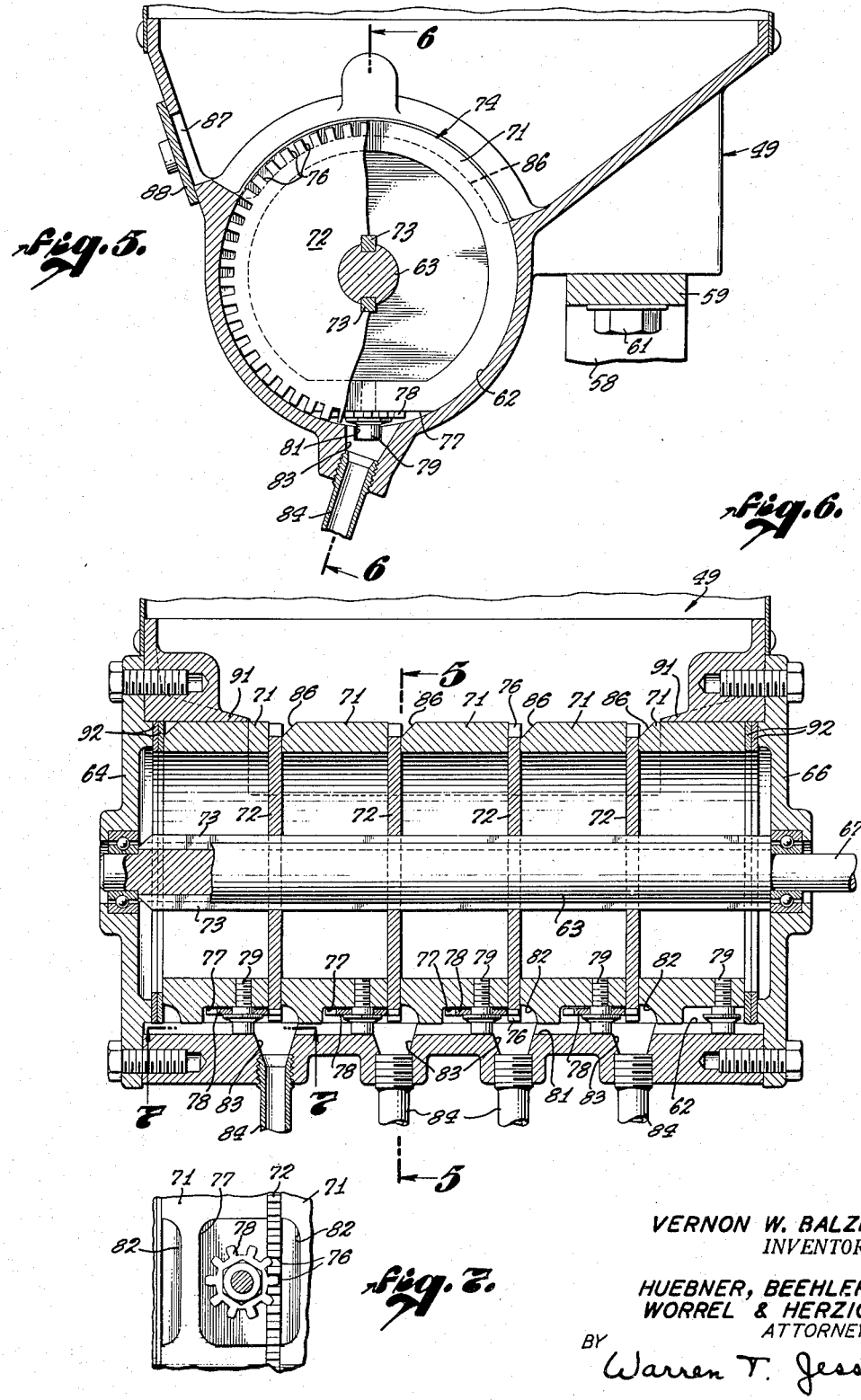

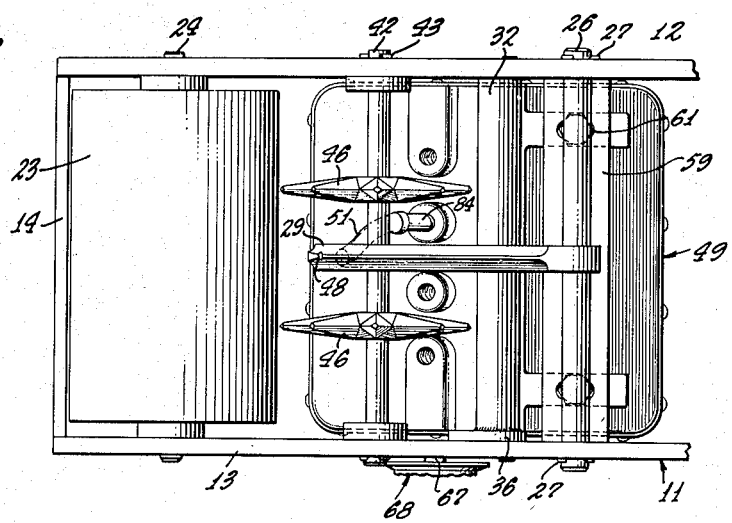
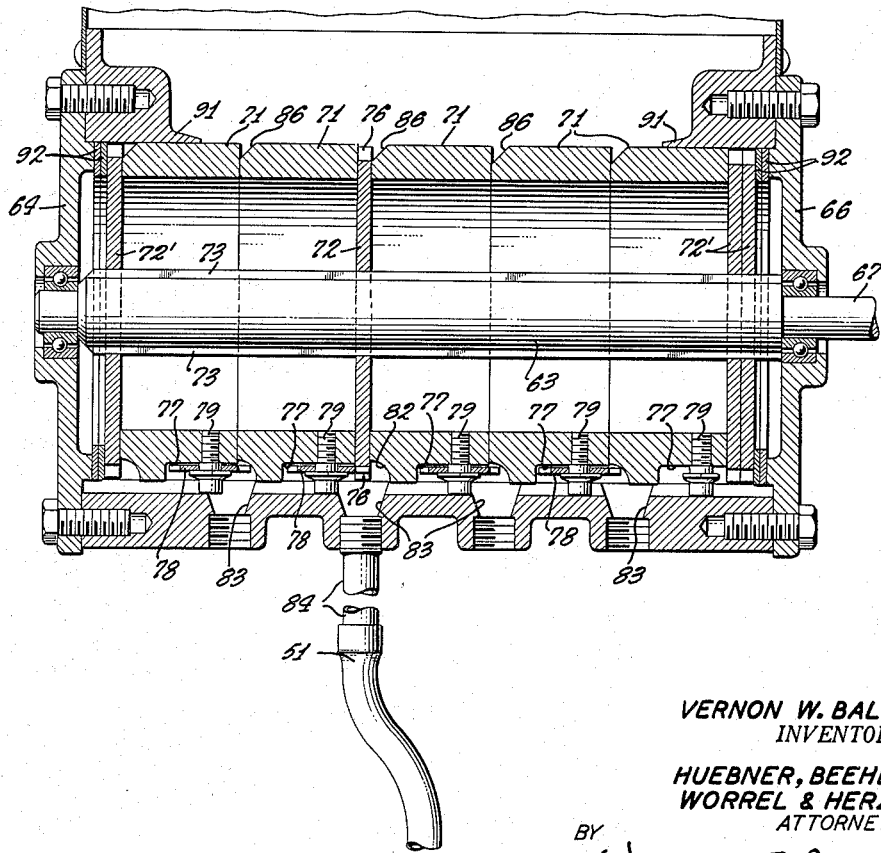

ent Office 2,732,975
Patented Jan. 31, 1956

2,732,975

SEED PLANTER

Vernon W. Balzer, Van Nuys, Calif., assignor to Hallett Manufacturing Company, Inglewood, Calif., a corporation of California Application June 18, 1951, Serial No. 232,225

4 Claims. (Cl. 221—234)

This invention relates to seed planters.

It is an object of this invention to provide an improved machine or apparatus adapted to be moved over a field to be planted, which machine will automatically plant seeds in accurately spaced rows, accurately distributed along each row.

It is a further object of this invention to provide a seed planter adapted to plant seeds, especially coated seeds, in uniform and accurately spaced arrangement over the field to be planted, whereby increased yield per acre and increased yield per seed is attained.

It is another object of this invention to provide a seed planter simple in construction and operation, and requiring a minimum of operating and maintenance attention, which, when hauled across a field to be planted, will automatically dig a furrow or a plurality of furrows and automatically and uniformly drop seeds into said furrows and then cover up said furrows, whereby the entire planting is achieved with a single passage of the apparatus over the field.

It is a further object to provide in such a seed planting machine convenient mechanism for adjusting the depth of the furrow in which the seeds are to be planted.

It is a further object of this invention to provide a seed planter which may be quickly adjusted to accommodate differing sizes of seeds.

It is a still further object of this invention to provide a seed planter which may be quickly adjusted to plant one furrow or a plurality of furrows in a single pass of the machine.

It is a still further object of this invention to provide a seed planter having means for insuring against clogging of the seed feeding and distribution mechanism, thereby minimizing the maintenance attention which must be afforded the machine.

In accordance with these and other objects which will become apparent in the ensuing specification, a preferred form of the instant invention will now be described with reference to the accompanying drawings wherein:

Fig. 2 is a bottom view looking at the under side of the planter shown in Fig. 1.

Fig. 3 is a fragmentary elevation partially sectioned, illustrating one of the furrow digging plowshares.

Fig. 4 is an elevational cross-section taken on line 4—4 of Fig. 3.

Fig. 5 is a fragmentary elevational section showing particularly the seed distributing mechanism of the instant invention and taken on line 5—5 in Fig. 6.

Fig. 6 is a cross-section taken on line 6—6 in Fig. 5.

Fig. 7 is a fragmentary section taken on line 7—7 in Fig. 6.

Fig. 8 is a bottom view similar to Fig. 2, illustrating the apparatus adjusted and set up to plant only a single furrow of seeds.

Fig. 9 is a section similar to Fig. 6, but illustrating the single furrow set-up as opposed to the multiple furrow set-up illustrated in Fig. 6.

Figure 1:
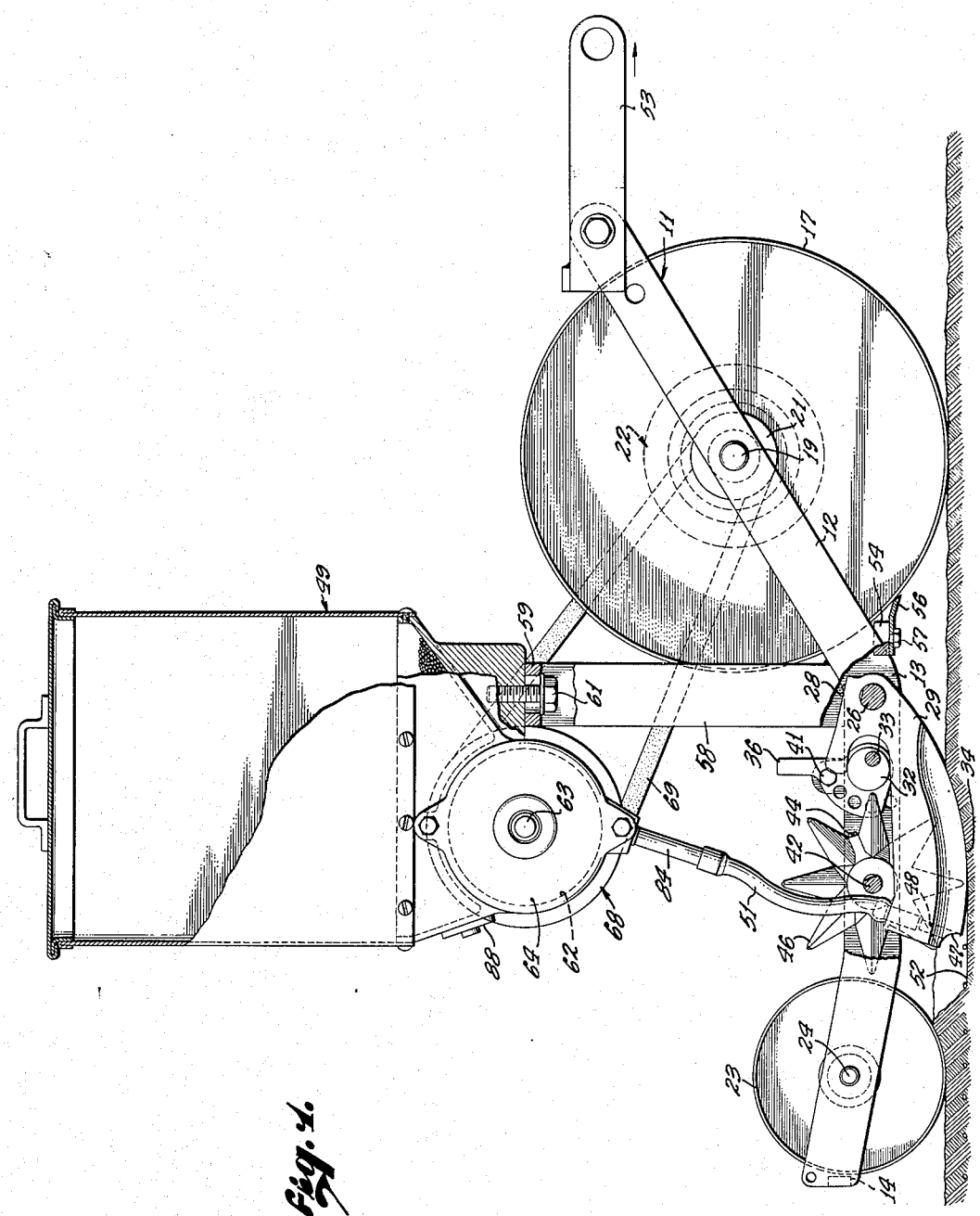
Fig. 1 is an elevation of the complete apparatus or vehicle constituting the instant seed planter.

Referring to the drawings, 11 designates the frame of the seed planter comprising a pair of longitudinal side members 12 and 13 coupled at the rear by a transverse member 14 and at the front by another transverse member 16. Toward the front of the planter and between the longitudinal members 12 and 13 is a large wheel roller 17 fixed by a set screw 18 to an axle 19 journalled in ball-bearings 21 affixed to the frame 11. The left hand end of the axle 19 protrudes beyond the frame 11 and has fixed thereto a set of graduated pulleys 22.

Within the rear portion of the frame 11 is journalled a similar but smaller wheel roller 23 on a shaft 24. The rollers 17 and 23 serve as wheels for the frame 11, whereby the seed planter may be hauled over a field to be planted, and also serve as rollers to even out the surface of the field both before and after the planting operation.

Transversely spanning the members 12 and 13 intermediate the rollers 17 and 23 is a plowshare shaft 26 journalled in opposite bores in the members 12 and 13 secured to the frame by cotter pins 27. Secured to the shaft 26 by set screws 28 are four plowshares 29 which extend downward and to the rear as best seen in Fig. 1. Each plowshare 29 has formed therein an elongate aperture 31 just behind the shaft 26, and through the aligned apertures 31 of the plowshares 29 passes an adjusting shaft 32. The shaft 32 is circular in cross-section, but is journalled eccentrically in the members 12 and 13 by a pair of pivot bolts 33 (Fig. 4). The diameter of the shaft 32 is such that it completely spans the apertures 31. Thus, the rotative position of the shaft 32 serves to angularly adjust the plowshares 29 with respect to the frame 11, thereby to determine the depth of furrow that the lower edge 34 of the plowshares 29 will dig. Just inside the frame member 13 there is secured to the shaft 32 as by welding, an adjusting arm 36 which has a plurality of adjusting holes 37 therein spaced circumferentially with respect to the pivot bolt 33. The holes 37 may be selectively registered with a threaded bore 38 formed in a tab 39 extending up from the member 13. By screwing a bolt 41 into the bore 38 through a selected hole 37, the angular position of the shaft 32 may be set, thereby determining the adjustment of the several plowshares 29.

To the rear of the eccentric adjusting shaft 32 is disposed a transverse shaft 42 journalled in the members 12 and 13 and held by cotter pins 43 in the manner of the shaft 26. Secured to the shaft 42, as by set screws 44, are a plurality of scarifying or star wheels 46, intercalated with respect to the plowshares 29. The star wheels extend roughly to a depth equal to that of the furrows dug by the plowshares 29, and serve to break up the ground between the furrows in which the seeds are planted. The star wheels 46 are self-rotating; that is, are rotated simply by the movement of the planter across the field.

Each of the plowshares 29 has a relieved portion 47 (Fig. 3) at the bottom and rear thereof and a downwardly extending passageway 48 through which seeds are delivered to the furrow just dug by the plowshare. Extending between each passageway 48 and a seed hopper 49 (to be described hereinafter) is a flexible conduit 51 which serves to convey seeds at accurately spaced intervals from the hopper to the furrow 52 (Fig. 1) dug by the plowshare 29.

The seed planter is drawn by a pair of tongues 53 pivoted at each side to the front of the frame 11. Spanning the members 12 and 13 adjacent the periphery of the roller 17, is a bar 54 to which is adjustably secured a scraper blade 56 by means of bolts 57, passing through elongate holes 56 in the blade 56. The blade 56 serves to keep the roller 17 relatively free of clots of mud and dirt which might stick to it.

The mechanism for uniformly distributing seeds into the furrow 52 will now be described. Secured, as by welding, to the frame members 12 and 13 are a pair of upstanding supports 58 spanned at the top by a horizontal cross member 59. The cross member 59 serves to support the hopper 49 by means of a plurality of bolts 61.

As best seen in Fig. 5 the hopper 49 has a cylindrical chamber 62 forming the bottom portion thereof. The axis of this chamber is transverse of the seed planter proper, and on this axis is disposed a shaft 63 journalled in side plates 64 and 66 closing the ends of the chamber 62. The shaft 63 extends through and beyond the side plate 66 as shown at 67 in Fig. 6, and to this extending end is affixed a set of pulleys 68 (Fig. 2), selectively coupled to the pulleys 22 on the shaft of the roller 17 by means of a belt 69. Within the chamber 62 and coaxial with the shaft 63 are disposed a plurality of intercalated cylindrical spacers 71 and seed conveying wheels 72. The wheels 72 are keyed to the shaft 63 by a pair of keys 73. Spacers 71 and wheels 72 are of approximately the same diameter as the cylindrical chamber 62, thereby forming in effect an arcuate floor 74 in the hopper 49 as best seen in Fig. 5. Each of the wheels 72 is provided with a plurality of seed receiving and conveying recesses or notches 76, by means of which seeds are conveyed from the floor 74 to the bottom of the hopper, upon rotation of the wheels 72.

The bottom of each spacer 71 is relieved, as shown at 77, to receive a toothed ejection wheel 78 journaled on a vertical shaft 79 secured as by threading into the bottom of the spacer 71. The lower ends of each of the shafts 79 are disposed in a longitudinal keyway 81 formed along the bottom of the hopper, thus keying each of the spacers 71 against rotation, which would otherwise occur because of frictional drag between the rotating wheels 72 and the spacers 71. The teeth of the ejection wheels 78 mate with the notches 76 in the wheels 72; wheels 78 are thereby rotated on the shafts 79 whenever the wheels 72 are rotated. This mating of the teeth of the wheels 78 serves to positively eject seeds from the notches 76 into a counter-relieved portion 82 formed at the bottom of each spacer 71 opposite from the relief 77 occupied by the wheels 78. In the bottom wall of the hopper directly beneath each seed wheel 72 is a funnel-like passageway 83 communicating with a rigid conduit 84 which in turn leads to the flexible conduit 51, as best seen in Fig. 1.

It is preferred to select seed wheels 72 of such thickness that their notches 76 accommodate just one seed, thereby assuring absolute uniformity in the spacing of the seeds in the furrow 52. This being the case it has been found advisable to bevel each of the spacers 71 adjacent a seed wheel 72 as shown at 86 in Figs. 5 and 6. This gives greater assurance that in the operation of the planter each of the notches 76 will be occupied by a seed as the wheel 72 carries the seeds from the floor 74 to the passageways 83.

In order to empty the hopper 49 of unused seeds, a cleanout aperture 87 is formed near the bottom opposite the floor 74, which aperture is selectively closed by a plate 88 that may be pivoted into position closing or opening the cleanout aperture.

Operation of the apparatus above described is substantially as follows: The planter is first linked to a tractor by the tongues 53. As it is towed over the field, the front roller 17 smoothes out the ground, which has been preferably pre-plowed, and the plowshares 29 dig a plurality of parallel furrows. Between these furrows the ground is scarified by the rotating star wheels 46. Rotation of front roller 17 causes the shaft 63 to rotate by virtue of the coupling through the pulleys 22 and 68 and the belt 69. The seed wheels 72 keyed to the shaft 63 rotate, carrying in their recesses 76 seeds from the body portion of the hopper 49 down to the bottom, where the seeds drop out of the recesses into the passageways 83 and thence into the conduits 84 and 51.

As the wheels 72 rotate they also cause to rotate the ejection wheels 78, the teeth of which enter into the notches 76, thereby assuring positive emptying of the notches should there be any tendency for seeds to stick therein.

The ejected seeds, at uniformly spaced intervals, drop through the conduits 51 into the passageways 46 in the plowshares 29 and thence into the furrows 52. The furrows 52 are immediately covered over by the rear roller 23, thereby completing the planting operation.

It will be noted that the seeds are uniformly planted irrespective of the speed at which the planter is towed over the field, since there is a direct correlation through the belt 69, between each revolution of the roller 17 and the number of seeds dropped into the passageways 83. To change the spacing of seeds in the furrows, it is only necessary to alter the belt ratio between the shafts 19 and 63, by shifting the belt 69 in the pulleys 22 and 68. In the illustrated embodiment, four alternate ratios are possible, producing four possible seed spacing intervals.

It is a further feature of this invention that ready adjustment may be provided for any number of furrows up to the maximum for which the machine is built. Figs. 8 and 9 illustrate the seed planter adjusted for planting a single furrow, in contrast to the four-furrow set-up shown in Figs. 1 through 7. This adjustment is achieved as follows: One or both of the side plates 64 and 66 are removed. The shaft 63 is also removed carrying with it the intercalated spacers 71 and seed wheels 72. The desired re-arrangement of seed wheels 72 is then made on the shaft and the shaft replaced in the chamber 62. As shown in Fig. 9 the seed wheels 72' which are not to be used, are placed at the respective ends of the shaft and thereby come under the arcuate ledges 91 which shield them from the interior of the hopper 49 so that no seeds drop into the notches in the wheels 72'. Thus, in Fig. 9, only one of the wheels 72 is in operative position. When used in this manner it is preferred to unscrew the unused tubes or conduits 84 and store them.

A corresponding change is made at the bottom of the planter, where all but one of the plowshares 29 is removed from the shaft 26 and stored. Only a pair of scarifying wheels 46, one on each side of the retained plowshare 29, is left on.

In order to accommodate seed wheels 72 of different thickness, the chamber 62 is made with some extra length, which is taken up by ring-like shims 92 when the thick seed wheels 72 are not used. When using very thin wheels 72 more shims 92 are placed at each end of the shaft, and when using the thickest size of wheel 72, all the shims 92 are removed.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus, and articles.

What is claimed is:

1. In combination in a seed planter, a hopper having a cylindrical chamber at the bottom thereof, the bottom of said hopper having a longitudinal keyway therein, a shaft extending through said chamber on the axis thereof, a plurality of intercalated cylindrical spacers and seed wheels disposed coaxially within said chamber, said seed wheels being keyed to said shaft and including a plurality of notches around the periphery thereof adapted to convey seeds to the bottom of said chamber, said spacers and wheels being of approximately the same diameter, each spacer having a relieved portion at the bottom thereof adjacent the contiguous wheel, toothed seed ejection wheels rotatably mounted on vertical shafts secured one in each of said spacers, said wheels rotating in the relieved portions of said spacers, the teeth of said wheels mating with the notches in the adjacent seed wheels, whereby upon rotation of said shaft said seed wheels are caused to rotate, in turn rotating said ejection wheels, the lower ends of the ejection wheel shafts projecting into said keyway to restrain said spacers against rotation, said spacers including counter-relieved portions at the bottom opposite the first mentioned relieved portions thereof, said counter-relieved portions receiving seeds ejected from said notches by the teeth of said ejection wheels, each of said spacers being beveled at its upper edge adjacent a contiguous seed wheel, and a plurality of seed conveying conduits communicating with the bottom of said chamber beneath the respective seed wheels and adapted to convey seeds from said hopper to the field to be planted.

2. Mechanism for dispensing pellets, such as seeds, comprising, in combination: a hopper having a cylindrical chamber in communication therewith, a shaft passing substantially axially through said chamber, a plurality of pellet conveying wheels each having a plurality of notches spaced about the periphery thereof for receiving and conveying pellets, means for keying said wheels to said shaft for causing said wheels to rotate with said shaft and for permitting said wheels to be slid axially of said shaft for ready removal or realignment with respect to said shaft, a plurality of cylindrical spacers each having an outer diameter substantially at least as great as that of said wheels and disposed in said chamber circumjacent said shaft, said spacers being selectively positionable among said wheels so as to effect any desired permutation of wheels and spacers, means for keying said spacers with respect to said chamber for preventing rotation of said spacers by shaft rotation, a plurality of passageways communicating with the respective wheels at the bottom portions thereof and effective to receive pellets conveyed from said hopper in said notches, and a plurality of toothed ejection wheels mounted to said spacers for rotation about axes substantially perpendicular to said shaft, the teeth of said ejection wheels mating with the notches of said conveying wheels at substantially right angles, so that pellets are ejected from the notches in a sidewise motion into said passageways.

3. Mechanism for dispensing pellets, such as seeds, comprising, in combination: a hopper having a cylindrical chamber in communication therewith, a shaft passing substantially axially through said chamber, a plurality of pellet conveying wheels each having a plurality of notches spaced about the periphery thereof for receiving and conveying pellets, means for keying said wheels to said shaft for causing said wheels to rotate with said shaft and for permitting said wheels to be slid axially of said shaft for ready removal or realignment with respect to said shaft, a plurality of cylindrical spacers each having an outer diameter substantially at least as great as that of said wheels and disposed in said chamber circumjacent said shaft, said spacers being selectively positionable among said wheels so as to effect any desired permutation of wheels and spacers, means for keying said spacers with respect to said chamber for preventing rotation of said spacers by shaft rotation, a plurality of passageways communicating with the respective wheels at the bottom portions thereof and effective to receive pellets conveyed from said hopper in said notches, and a plurality of toothed ejection wheels mounted to said spacers for rotation about axes substantially perpendicular to said shaft, the teeth of said ejection wheels mating with the notches of said conveying wheels at substantially right angles, so that pellets are ejected from the notches in a sidewise motion into said passageways, each of said spacers being relieved opposite an ejection wheel thereby to provide a space for the sidewise ejection of pellets, each relief being in communication with a respective said passageway.

4. Mechanism for dispensing pellets, such as seeds, comprising, in combination: a hopper having a cylindrical chamber in communication therewith, a shaft passing substantially axially through said chamber, a plurality of pellet conveying wheels each having a plurality of notches spaced about the periphery thereof for receiving and conveying pellets, means for keying said wheels to said shaft for causing said wheels to rotate with said shaft and for permitting said wheels to be slid axially of said shaft for ready removal or realignment with respect to said shaft, a plurality of cylindrical spacers each having an outer diameter substantially at least as great as that of said wheels and disposed in said chamber circumjacent said shaft, said spacers being selectively positionable among said wheels so as to effect any desired permutation of wheels and spacers, pintles secured to said spacers for keying said spacers with respect to said chamber for preventing rotation of said spacers by shaft rotation, said pintles mating in corresponding recesses formed in the lower wall of said chamber, a plurality of passageways communicating with the respective wheels at the bottom portions thereof and effective to receive pellets conveyed from said hopper in said notches, and a plurality of toothed ejection wheels journaled to said pintles, the teeth of said ejection wheels mating with the notches of said conveying wheels for ejecting pellets from said notches into said passageways.

References Cited in the file of this patent

UNITED STATES PATENTS

| Number | Name | Date |
|---|---|---|
| Re. 10,001 | Mead | Jan. 3, 1882 |
| 27,162 | Smith | Feb. 14, 1860 |
| 46,523 | Doubler | Feb. 21, 1865 |
| 84,121 | Hogle | Nov. 17, 1868 |
| 107,857 | Beshler | Oct. 4, 1870 |
| 335,966 | Shaw | Feb. 9, 1886 |
| 363,604 | Crane | May 24, 1887 |
| 641,429 | Baskin | Jan. 16, 1900 |
| 815,771 | White | Mar. 20, 1906 |
| 933,134 | Soto | Sept. 7, 1909 |
| 969,918 | Streitz | Sept. 13, 1910 |
| 1,220,684 | Ray | May 27, 1917 |
| 1,729,535 | Brown | Sept. 24, 1929 |
| 1,891,817 | Hildebrand | Dec. 20, 1932 |
| 2,440,846 | Cannon | May 4, 1948 |
| 2,510,658 | Rassmann | June 6, 1950 |
| 2,581,039 | Millstein | Jan. 1, 1952 |